United States Patent  (10) Patent No.: US 12,114,342 B2
Chen et al.  (45) Date of Patent: Oct. 8, 2024

(54) SCHEDULING WEIGHT CALCULATION FOR MU MIMO

(71) Applicant: Telefonaktiebolaget LM Ericsson (PUBL), Stockholm (SE)

(72) Inventors: Xixian Chen, Ottawa (CA); Dongsheng Yu, Ottawa (CA); Xiaoming Lai, Ottawa (CA); Weigang Li, Ottawa (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 336 days.

(21) Appl. No.: 17/619,884

(22) PCT Filed: Jul. 2, 2019

(86) PCT No.: PCT/IB2019/055647
§ 371 (c)(1),
(2) Date: Dec. 16, 2021

(87) PCT Pub. No.: WO2021/001678
PCT Pub. Date: Jan. 7, 2021

(65) Prior Publication Data
US 2022/0312432 A1   Sep. 29, 2022

(51) Int. Cl.
*H04W 72/542*  (2023.01)
*H04B 7/0452*  (2017.01)

(52) U.S. Cl.
CPC ........ *H04W 72/542* (2023.01); *H04B 7/0452* (2013.01)

(58) Field of Classification Search
CPC .......................... H04W 72/542; H04B 7/0452
See application file for complete search history.

(56) References Cited

U.S. PATENT DOCUMENTS 7,889,758 B2   2/2011   Li et al.
9,253,788 B2   2/2016   Roh et al.
(Continued)

FOREIGN PATENT DOCUMENTS

CN   102420645 B   12/2015

OTHER PUBLICATIONS

Y. Li, X. Chen, W. Zhao and B. Cao, "Packet scheduling with QoS support in LTE downlink MIMO system," 2012 1st IEEE International Conference on Communications in China (ICCC), Beijing, China, 2012, pp. 97-102, doi: 10.1109/ICCChina.2012.6356998 (Year: 2012).*

(Continued)

*Primary Examiner* — Edan Orgad
*Assistant Examiner* — Malick A Sohrab
(74) *Attorney, Agent, or Firm* — Baker Botts L.L.P

(57) ABSTRACT

According to certain embodiments, a method for use in a network node for scheduling wireless transmissions comprises determining a channel quality weight for a first wireless channel based on its number of information bits and a channel quality weight for a second wireless channel based on its number of information bits. The number of information bits is based on a signal to interference plus noise (SINR) measurement and a modulation coding scheme of the wireless channels. The method further comprises determining a scheduling weight for the first wireless device based on the channel quality weight for the first wireless channel, determining a scheduling weight for the second wireless device based on the channel quality weight for the second wireless channel, and scheduling a transmission to one of the first and second wireless devices based on the scheduling weights of the first and second wireless devices.

14 Claims, 9 Drawing Sheets

(56) References Cited

U.S. PATENT DOCUMENTS

| | | | | |
|---|---|---|---|---|
| 2010/0035645 A1* | 2/2010 | Chang | ................ | H04W 52/241 |
| | | | | 455/522 |
| 2013/0163540 A1* | 6/2013 | Roh | ................... | H04W 72/542 |
| | | | | 370/329 |
| 2015/0141027 A1* | 5/2015 | Tsui | ...................... | H04W 24/02 |
| | | | | 455/452.1 |
| 2016/0135076 A1* | 5/2016 | Grinshpun | ........ | H04W 28/0284 |
| | | | | 370/252 |

OTHER PUBLICATIONS

Shaofeng Du, Yafeng Wang, Yong Zhang and Yang Dacheng, "Adaptation between codebook based SU-MIMO and MU-MIMO with single MCS feedback in LTE," 2010 3rd IEEE International Conference on Broadband Network and Multimedia Technology (IC-BNMT), Beijing, 2010 (Year: 2010).*

PCT International Search Report issued for International application No. PCT/IB2019/055647—Feb. 25, 2020.

PCT Written Opinion of the International Searching Authority issued for International application No. PCT/IB2019/055647—Feb. 25, 2020.

Adaptation Between Codebook Based SU-MIMO and MU-MIMO With Single MCS Feedback in LTE by Shaofeng Du et al., 3rd IEEE International Conference on Broadband Network and Multimedia Technology (IC-BNMT)—Oct. 26, 2010.

Packet Scheduling With QOS Support in LTE Downlink MIMO System by Yun Li et al., 1st IEEE International Conference on Communications in China: Communications QoS and Reliability (CQR)—Aug. 15, 2012.

ETSI TS 138 211 v15.3.0 (Oct. 2018); 5G; NR; Physical channels and modulation (3GPP TS 38.211 version 15.3.0 Release 15).

* cited by examiner

SCHEDULING WEIGHT CALCULATION FOR MU MIMO

PRIORITY

This nonprovisional application is a U.S. National Stage Filing under 35 U.S.C. § 371 of International Patent Application Serial No. PCT/IB2019/055647 filed Jul. 2, 2019 and entitled "SCHEDULING WEIGHT CALCULATION FOR MU MIMO" which is hereby incorporated by reference in its entirety.

TECHNICAL FIELD

Embodiments of the present disclosure are directed to wireless communications and, more particularly, to scheduling weight calculations for multi-user (MU) multiple input multiple output (MIMO) wireless transmissions.

BACKGROUND

An increase in the level of traffic such as voice over internet protocol (VoIP), video, web browsing, etc. with diverse quality of service (QoS) requirements has strained the capability of existing wireless networks. The level of mobile data traffic has grown exponentially and is projected to increase by 1000 times in the next five years. The continuous traffic growth and a need to achieve required QoS for emerging wireless applications necessitate the industrial and research communities to provide better solutions in wireless communication systems. One of the solutions includes Third Generation Partnership Project (3GPP) fifth generation (5G) new radio (NR) networks that provide increased data rate, low latency, scalable bandwidth, mobility and extended coverage.

To meet these demands, 5G NR started a new era of improved network capacity and higher bandwidth availability to each user. The radio resource allocation for users has emerged as an active research area. Parameters such as number of users, channel conditions, type of traffic class and so on play an important role while designing a radio transmission scheduling algorithm. The task of a scheduler is to distribute scheduling resources to maintain QoS for all users and optimize performance, which results in more satisfied users.

The proportional fairness scheduling (PFS) algorithm is widely used for long term evolution (LTE) and 5G NR wireless communication systems. The PFS algorithm accounts for both short-term variation of the radio channel conditions and long-term throughput of each user. The user with the largest R[n]/Rav is served first, where R[n] is the data rate in the current transmission time interval (TTI) or slot n and Rav is the average data rate for the user in the past average window. The size of the average window determines the maximum duration that a user can be starved from data and reflects the compromise between the maximum tolerable delay and the cell throughput. According to the PFS algorithm, if a user is enjoying a high average throughput, its R[n]/Rav will probably not be the highest. Then it may give way to other users with poor average throughput and therefore high R[n]/Rav in the next TTIs or slots, which improves the average throughput of the latter. Conversely, if the average throughput of a user is low, the R[n]/Rav could be high and it might be granted the right of transmission even if its current channel condition is not the best.

A scheduler uses the weight functions to realize the QoS and to optimize the performance. A higher weight means the data traffic of a user has a higher priority to get access to radio resources. The conventional PFS algorithm has a weight calculation that accounts for both scheduled averaged data rate and channel quality per bearer or per priority queue: $W=(1-CQF)*W_R+CQF*W_C$ PFS weight calculation is realized when higher data rate results in a lower rate weight ($W_R$), and higher channel quality results in a higher channel quality weight ($W_C$). Using these two weight components, PFS provides a tradeoff between user fairness and the system performance, which can be tuned by a channel quality fraction (CQF) value. CQF controls how big a portion of channel quality weight contributes to a user's weight. It varies from 0 to 1.

When CQF is closer to zero, fairness increases because the scheduler will try to bring all the users to the same received data rate range. System performance, however, could degrade because more resources need to be allocated to users in bad channel conditions to give them as high a data rate as users in good channel conditions. When CQF is closer to its maximum value, then resources are spent on good channel users yielding a high system throughput. Cell edge users, however, are disfavored.

Different QoS requirements translate into different weight functions, which calculate a weight based on some QoS related attribute. A higher weight means higher priority access to radio resources.

FIG. 1 graphs an example of weight functions with proportional fairness scheduling strategy for two different QoS requirements. The left hand graph illustrates a weight Wr as a function of the average data rate for two QoS requirements (QCI, QoS Class Identifier), QCIx and QCIy. The vertical axis represents the weight and the horizontal axis represents the average data rate. As illustrated, as the average data rate increases, Wr decreases. The right hand graph illustrates a weight Wc as a function of the channel quality for two QoS requirements, QCIx and QCIy. As the channel quality increases, Wc increases. Wr and Wc may be combined according to the PFS function given above.

Multiple-user multiple-input multiple-output (MU-MIMO) enhanced by massive MIMO beamforming is widely supported in LTE and 5G commercial mobile networks to increase cell throughput and capacity so as to improve overall network performance and spectrum efficiency.

SUMMARY

Based on the description above, there currently exist certain challenges with scheduling for multiple-user multiple-input multiple-output (MU-MIMO) wireless transmission. For example, the conventional proportional fairness scheduling (PFS) algorithm uses the estimated signal to interference plus noise ratio (SINR), which is derived from a channel quality indicator (CQI) report from a user equipment (UE), to calculate the channel quality weight. There are at least two drawbacks with this existing solution: (a) the existing solution does not consider MU-MIMO scenarios, which means the advantage of MU-MIMO to increase the cell throughput cannot be fully utilized; and (b) the mapping from SINR to the data rate that can be sent to a UE is not linear, thus using SINR to calculate the channel quality weight directly cannot fully realize the benefit of PFS.

The SINR is usually calculated in dB (log) domain. When a UE reports two CQIs in dB for two code words, the base station first converts the estimated SINRs from dB domain to linear domain. After summation in the linear domain, the base station converts the result back into dB domain. The computation complexity is relatively high.

Certain aspects of the present disclosure and their embodiments may provide solutions to these or other challenges. Particular embodiments use information bits instead of SINR to calculate channel quality weight. The MU-MIMO scenarios may be considered when calculating the channel quality weights to improve the cell throughput. Particular embodiments may recalculate the UE weight during the scheduling phase.

According to some embodiments, a method for use in a network node for scheduling wireless transmissions comprises determining a channel quality weight for a first wireless channel between the network node and a first wireless device based on a number of information bits per resource element that can be carried by the first wireless channel. The number of information bits per resource element that can be carried by the first wireless channel is based on a signal to interference plus noise (SINR) measurement of the first wireless channel and a modulation coding scheme used for the first wireless channel. The method further comprises determining a scheduling weight for the first wireless device based at least on the channel quality weight for the first wireless channel.

The method also determines a channel quality weight for a second wireless channel between the network node and a second wireless device based on a number of information bits per resource element that can be carried by the second wireless channel. The number of information bits per resource element that can be carried by the second wireless channel is based on a SINR measurement of the second wireless channel and a modulation coding scheme used for the second wireless channel.

The method further comprises determining a scheduling weight for the second wireless device based at least on the channel quality weight for the second wireless channel and scheduling a transmission to at least one of the first and second wireless devices based on the scheduling weights of the first and second wireless devices.

In particular embodiments, the method further comprises determining a third wireless device is able to be paired with the first wireless device using MU-MIMO transmission and determining a channel quality weight for a third wireless channel between the network node and the third wireless device based at least on a combined number of information bits per resource element that can be carried by the first wireless channel and the third wireless channel. The number of information bits per resource element that can be carried by the first wireless channel is based on a SINR measurement of the first wireless channel and a modulation coding scheme used for the first wireless channel and the number of bits per resource element that can be carried by the third wireless channel is based on a SINR measurement of the third wireless channel and a modulation coding scheme used for the third wireless channel. The method further comprises determining a scheduling weight for the third wireless device based at least on the channel quality weight for the third wireless channel. Determining the channel quality weight for the first wireless channel between the network node and the first wireless device comprises determining the channel quality weight based at least on the combined number of information bits per resource element that can be carried by the first wireless channel and the third wireless channel.

In particular embodiments, the SINR measurement for the first wireless channel is calculated based on a first portion of a total amount of power available for transmission over at least the first and third wireless channels and the SINR measurement for the third wireless channel is calculated based on a second portion of the total amount of power available for transmission over at least the first and third wireless channels.

In particular embodiments, scheduling the transmission comprises determining insufficient transmission resources are available for transmitting the third wireless channel to the third wireless device. The method further comprises determining an updated channel quality weight for the first wireless channel between the network node and the first wireless device based on a number of information bits per resource element that can be carried by the first wireless channel. The number of information bits per resource element that can be carried by the first wireless channel is based on the SINR measurement of the first wireless channel and a modulation coding scheme used for the first wireless channel. The method further comprises determining an updated scheduling weight for the first wireless device based at least on the updated channel quality weight for the first wireless channel and scheduling a transmission to at least one of the first and second wireless devices based on the updated scheduling weight of the first wireless device and the scheduling weight of the second wireless device.

In particular embodiments, determining the scheduling weight for any one of the wireless devices is based at least on the channel quality weight for the wireless channel to the wireless device and an average data rate for the wireless channel. Determining the scheduling weight for any one of the wireless devices may be based at least on the channel quality weight for the wireless channel to the wireless device and a round robin algorithm. Determining the scheduling weight for any one of the wireless devices may be based at least on the channel quality weight for the wireless channel to the wireless device and a delay-based algorithm, or any other suitable weight calculation algorithm.

According to some embodiments, a network node is operable to schedule wireless transmissions. The network node comprises processing circuitry operable to determine a channel quality weight for a first wireless channel between the network node and a first wireless device based on a number of information bits per resource element that can be carried by the first wireless channel. The number of information bits per resource element that can be carried by the first wireless channel is based on a SINR measurement of the first wireless channel and a modulation coding scheme used for the first wireless channel. The processing circuitry is further operable to determine a scheduling weight for the first wireless device based at least on the channel quality weight for the first wireless channel.

The processing circuitry also determines a channel quality weight for a second wireless channel between the network node and a second wireless device based on a number of information bits per resource element that can be carried by the second wireless channel. The number of information bits per resource element that can be carried by the second wireless channel is based on a SINR measurement of the second wireless channel and a modulation coding scheme used for the second wireless channel.

The processing circuitry is further operable to determine a scheduling weight for the second wireless device based at least on the channel quality weight for the second wireless channel and schedule a transmission to at least one of the first and second wireless devices based on the scheduling weights of the first and second wireless devices.

In particular embodiments, the processing circuitry is further operable to determine a third wireless device is able to be paired with the first wireless device using MU-MIMO transmission and determine a channel quality weight for a third wireless channel between the network node and the third wireless device based at least on a combined number of information bits per resource element that can be carried by the first wireless channel and the third wireless channel. The number of information bits per resource element that can be carried by the first wireless channel is based on a SINR measurement of the first wireless channel and a modulation coding scheme used for the first wireless channel and the number of bits per resource element that can be carried by the third wireless channel is based on a SINR measurement of the third wireless channel and a modulation coding scheme used for the third wireless channel. The processing circuitry is further operable to determine a scheduling weight for the third wireless device based at least on the channel quality weight for the third wireless channel. The processing circuitry is operable to determine the channel quality weight for the first wireless channel between the network node and the first wireless device by determining the channel quality weight based at least on the combined number of information bits per resource element that can be carried by the first wireless channel and the third wireless channel.

In particular embodiments, the SINR measurement for the first wireless channel is calculated based on a first portion of a total amount of power available for transmission over at least the first and third wireless channels and the SINR measurement for the third wireless channel is calculated based on a second portion of the total amount of power available for transmission over at least the first and third wireless channels.

In particular embodiments, the processing circuitry is operable to schedule the transmission by determining insufficient transmission resources are available for transmitting the third wireless channel to the third wireless device. The processing circuitry is further operable to determine an updated channel quality weight for the first wireless channel between the network node and the first wireless device based on a number of information bits per resource element that can be carried by the first wireless channel. The number of information bits per resource element that can be carried by the first wireless channel is based on the SINR measurement of the first wireless channel and a modulation coding scheme used for the first wireless channel. The processing circuitry is further operable to determine an updated scheduling weight for the first wireless device based at least on the updated channel quality weight for the first wireless channel and schedule a transmission to at least one of the first and second wireless devices based on the updated scheduling weight of the first wireless device and the scheduling weight of the second wireless device.

In particular embodiments, the processing circuitry is operable to determine the scheduling weight for any one of the wireless devices based at least on the channel quality weight for the wireless channel to the wireless device and an average data rate for the wireless channel. The processing circuitry may be operable to determine the scheduling weight for any one of the wireless devices based at least on the channel quality weight for the wireless channel to the wireless device and a round robin algorithm. The processing circuitry may operable to determine the scheduling weight for any one of the wireless devices based at least on the channel quality weight for the wireless channel to the wireless device and a delay-based algorithm, or any other suitable weight calculation algorithm.

According to some embodiments, a network node is operable to schedule wireless transmissions. The network node comprises a determining module and a scheduling module. The determining module is operable to determine a channel quality weight for a first wireless channel between the network node and a first wireless device based on a number of information bits per resource element that can be carried by the first wireless channel. The number of information bits per resource element that can be carried by the first wireless channel is based on a SINR measurement of the first wireless channel and a modulation coding scheme used for the first wireless channel. The determining module is further operable to determine a scheduling weight for the first wireless device based at least on the channel quality weight for the first wireless channel. The determining module also determines a channel quality weight for a second wireless channel between the network node and a second wireless device based on a number of information bits per resource element that can be carried by the second wireless channel. The number of information bits per resource element that can be carried by the second wireless channel is based on a SINR measurement of the second wireless channel and a modulation coding scheme used for the second wireless channel. The determining module is further operable to determine a scheduling weight for the second wireless device based at least on the channel quality weight for the second wireless channel. The scheduling module is operable to schedule a transmission to at least one of the first and second wireless devices based on the scheduling weights of the first and second wireless devices.

Also disclosed is a computer program product comprising a non-transitory computer readable medium storing computer readable program code, the computer readable program code operable, when executed by processing circuitry to perform any of the methods performed by the network node described above.

Certain embodiments may provide one or more of the following technical advantages. For example, particular embodiments derive the channel quality weight from the number of information bits instead of SINR. The channel quality weight derived from the information bits of all code words is proportional to the data rate that can be sent to a UE in the current transmission time interval (TTI) or slot. As a result, the cell throughput is higher than the conventional one under the same channel condition. This is not only applicable in MU-MIMO scenario but also applicable in SU-MIMO. Thus, it also improves existing SU-MIMO scheduling weight calculation.

For MU-MIMO transmissions, the base station derives the channel quality weight from the summation of the information bits of all UEs that can be paired together. As a result, the pairable UEs for MU-MIMO will have more opportunities to be scheduled in the current TTI or slot. Thus, the cell throughput is further increased.

In particular embodiments, the algorithm for computing the channel weight based on information bits is less computationally intensive than conventional calculations. A table look-up or piece wise line approximation may be used.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

One challenge with scheduling for multiple-user multiple-input multiple-output (MU-MIMO) wireless transmission is that the conventional proportional fairness scheduling (PFS) algorithm uses the estimated signal to interference plus noise ratio (SINR), which is derived from a channel quality indicator (CQI) report from a user equipment (UE), to calculate the channel quality weight. Some drawbacks are that the existing solution cannot take advantage of MU-MIMO to increase the cell throughput and the mapping from SINR to the data rate that can be sent to a UE is not linear, thus using SINR to calculate the channel quality weight directly cannot fully realize the benefit of PFS.

Certain aspects of the present disclosure and their embodiments may provide solutions to these or other challenges. Particular embodiments use information bits instead of SINR to calculate channel quality weight. The channel quality weight derived from the information bits of all code words is proportional to the data rate that can be sent to a UE in the current transmission time interval (TTI) or slot. As a result, the cell throughput is higher than the conventional one under the same channel condition.

Some embodiments take advantage of MU-MIMO scenarios when calculating the channel quality weights to improve the cell throughput. For example, for MU-MIMO transmissions the base station may derive the channel quality weight from the summation of the information bits of all UEs that can be paired together. As a result, the pairable UEs for MU-MIMO will have more opportunities to be scheduled in the current TTI or slot, which improves cell throughput.

Particular embodiments may recalculate the UE weight during the scheduling phase if needed. For example, if insufficient network resources exist to transmit all data, the weights may be recalculated based on a subset of data to transmit.

Particular embodiments are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

Some embodiments include channel quality weight calculation for single-user MIMO (SU-MIMO). As described above, particular embodiments use information bits instead of SINR to calculate channel quality weight.

Figure 1:
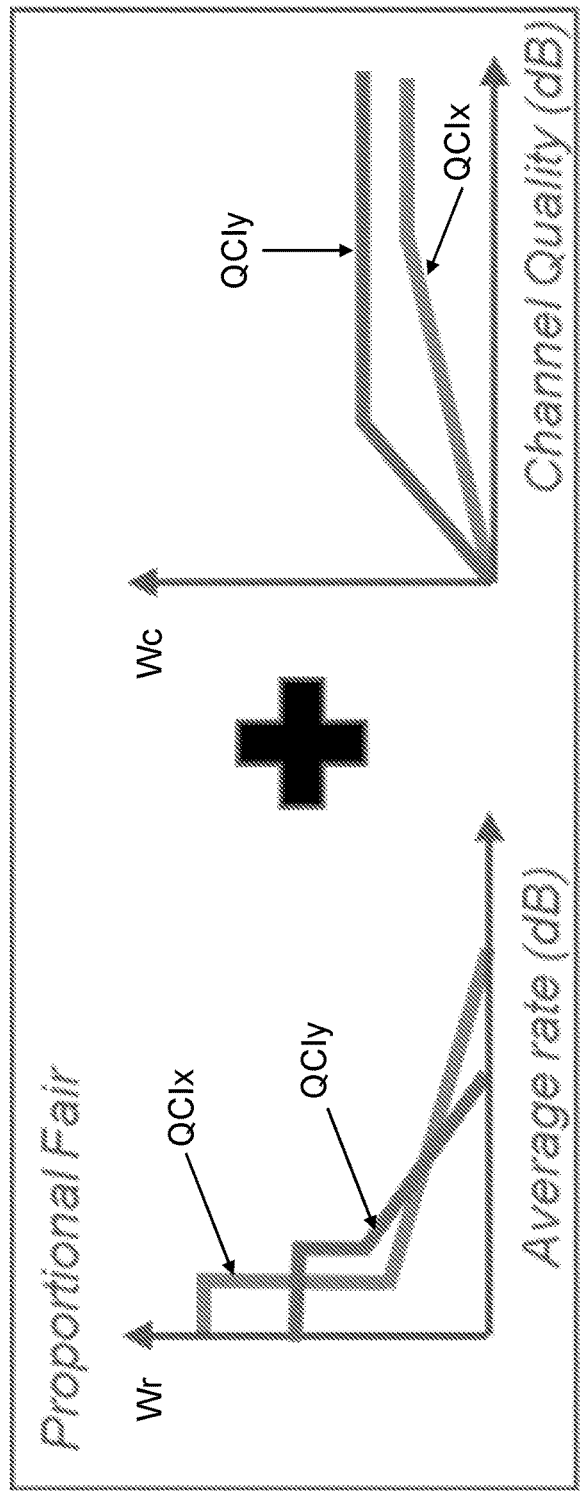
FIG. 1 graphs an example of weight functions with proportional fairness scheduling strategy for two different QoS requirements.
Figure 2:
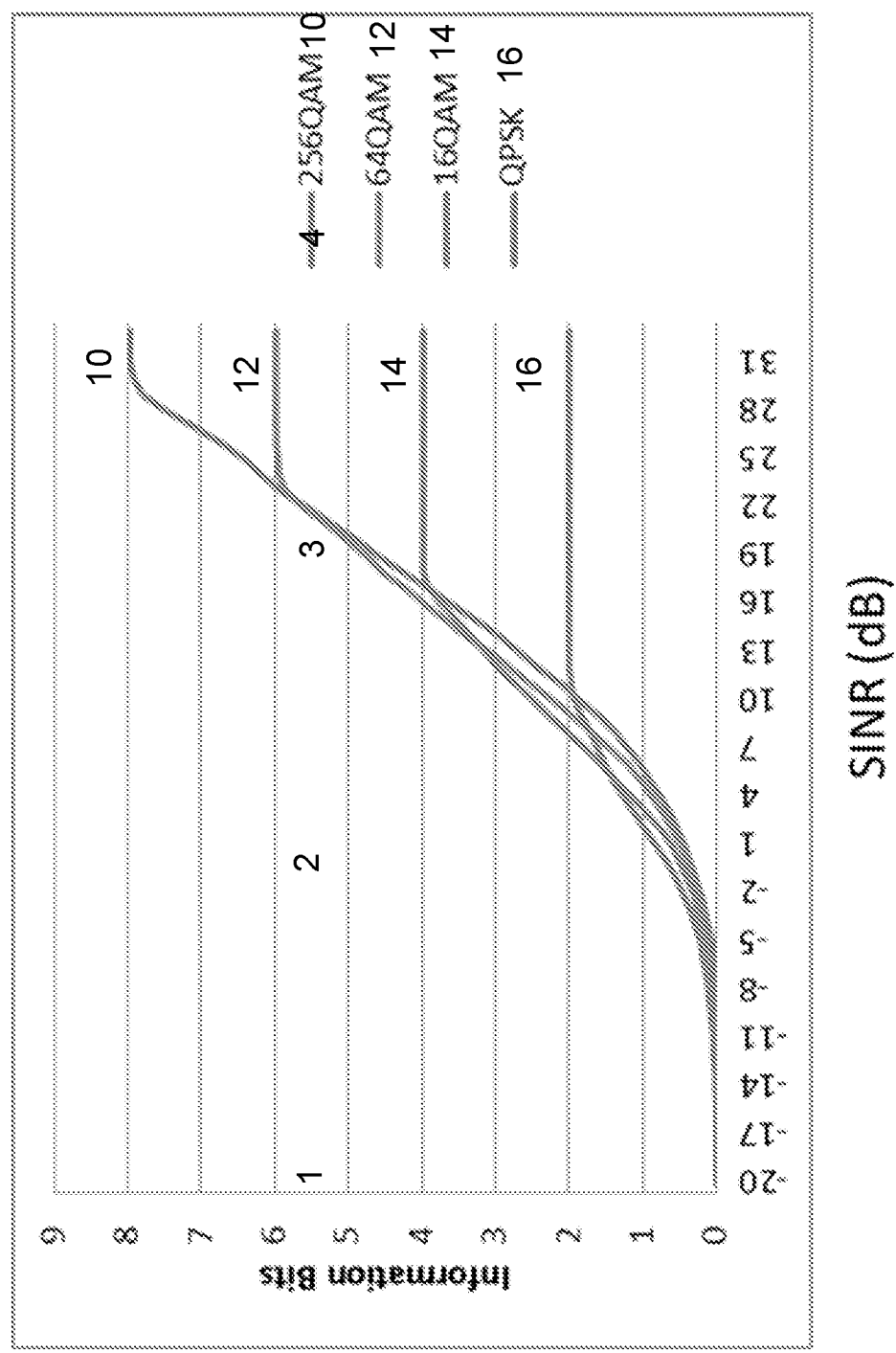
FIG. 2 is a graph illustrating resource element (RE) efficiency mapping curves for four different modulation modes.

FIG. 2 is a graph illustrating resource element (RE) efficiency mapping curves for four different modulation modes. More specifically, the graph illustrates SINR (horizontal axis) to information bits (vertical axis) for quadrature phase shift keying (QPSK) (line 16), 16 quadrature amplitude modulation (QAM) (line 14), 64QAM (line 12), and 256QAM (line 10) by assuming 10% block error rate (BLER).

For a given modulation mode and SINR, the corresponding information bits represents the number of bits that can be carried per resource element per layer. For example, if SINR is 0 dB, information bits=0.68, 0.49, 0.40, and 0.34, for QPSK, 16QAM, 64QAM, and 256 QAM, respectively. In general, for low SINR values (e.g., SINR<5 dB), QPSK has the highest information bits value. For medium ranged SINR values (e.g., from 6 dB to 13 dB), 16QAM has the highest information bits value. Between SINR=13 and SINR=23, 64QAM has the highest number of information bits. For high SINR values (e.g., SINR>23 dB), 256QAM gives the highest information bits value. To get the highest throughput for a given SINR value, a base station chooses the modulation mode with the highest information bits value.

FIG. 2 illustrates the information bits per modulation scheme and per layer that a resource element (RE) can carry (which is also referred to as RE efficiency) versus SINR by assuming 10% BLER. Based on FIG. 2, Table 1 is created by taking the maximum information bits value among all the modulation orders for each SINR value.

TABLE 1

SINR to information bits mapping table

| SINR | Modulation Order | Code Rate | Information Bits |
|---|---|---|---|
| −5 | 2 | 0.11108 | 0.222167969 |
| −4 | 2 | 0.14014 | 0.280273438 |
| −3 | 2 | 0.17505 | 0.350097656 |
| −2 | 2 | 0.22168 | 0.443359375 |
| −1 | 2 | 0.27856 | 0.557128906 |
| 0 | 2 | 0.33984 | 0.6796875 |
| 1 | 2 | 0.40723 | 0.814453125 |
| 2 | 2 | 0.47876 | 0.957519531 |
| 3 | 2 | 0.55396 | 1.107910156 |
| 4 | 2 | 0.62354 | 1.247070313 |
| 5 | 2 | 0.69165 | 1.383300781 |
| 6 | 4 | 0.38989 | 1.559570313 |
| 7 | 4 | 0.44763 | 1.790527344 |
| 8 | 4 | 0.50281 | 2.011230469 |
| 9 | 4 | 0.56750 | 2.270019531 |
| 10 | 4 | 0.62158 | 2.486328125 |
| 11 | 4 | 0.68079 | 2.723144531 |
| 12 | 4 | 0.74182 | 2.967285156 |
| 13 | 4 | 0.78345 | 3.133789063 |
| 14 | 6 | 0.56486 | 3.389160156 |
| 15 | 6 | 0.60929 | 3.655761719 |
| 16 | 6 | 0.65975 | 3.958496094 |
| 17 | 6 | 0.70443 | 4.2265625 |
| 18 | 6 | 0.75618 | 4.537109375 |
| 19 | 6 | 0.79118 | 4.747070313 |
| 20 | 6 | 0.83447 | 5.006835938 |
| 21 | 6 | 0.88045 | 5.282714844 |
| 22 | 6 | 0.93213 | 5.592773438 |
| 23 | 8 | 0.73676 | 5.894042969 |
| 24 | 8 | 0.76959 | 6.156738281 |
| 25 | 8 | 0.80145 | 6.411621094 |
| 26 | 8 | 0.84137 | 6.730957031 |
| 27 | 8 | 0.88824 | 7.105957031 |
| 28 | 8 | 0.93585 | 7.486816406 |

Assuming that all the layers in a codeword have the same modulation, for each RE of the allocated resources its information bits per layer is calculated based on its SINR by using Table 1. For example, if SINR=10 dB, the information bits of the RE per layer is 2.5 bits, and the number of layers is L, then the RE can carry 2.5 L information bits.

Third Generation Partnership Project (3GPP) Technical Specification (TS) 38.211 specifies that the maximum number of code words is two and each code word can have up to 4 layers. After getting the estimated SINR value for each code word, the estimated SINR is mapped to information bits, inforBits, by using the table look-up method derived from Table 1. Denote the estimated SINRs for code word 0 and code word 1 as SINR0 and SINR1, respectively. The UE's total information bits is calculated as UeInforBits=$L_0$*Table($SINR_0$)+$L_1$*Table($SINR_1$), where $L_0$ and $L_1$ are the number of layers for code word 0 and 1, respectively.

After obtaining UeInforBits, the channel quality weight can be calculated using the following pseudo code:

```
If UeInforBits > upperX
    W_C = upperY
Else if UeInforBits < lowerX
    W_C = lowerY
Else
```

$$W_C = lowerY + (UeInforBits - lowerX)\frac{upperY - lowerY}{upperX - lowerX}$$

```
End
```

Then, the proportional fairness weight can be calculated from W=(1−CQF)*$W_R$+CQF*$W_C$. Thus, for SU-MIMO particular embodiments use information bits instead of SINR to calculate channel quality weight because the channel quality weight derived from the information bits of all code words is proportional to the data rate that can be sent to a UE in the current transmission time interval (TTI) or slot. As a result, the cell throughput is higher than the conventional one under the same channel condition.

Some embodiments include channel quality weight calculation for MU-MIMO transmission. If M number of UEs can be paired for MU-MIMO transmission, and if they can be scheduled to use the same radio resources to transmit their data traffic, the overall cell throughput may be increased. Particular embodiments increase the PFS weights of the M UEs so that the UEs have more opportunities to be scheduled together by sharing the same allocated resources.

One option to increase PFS weight of MU-MIMO pairable UEs is to enhance the way channel quality weight is calculated. When calculating the channel quality weight of each UE, instead of using its individual information bits that can be carried per resource element per layer, some embodiments use the sum of the information bits of all the UEs that can be paired for MIMO transmission because they share the same allocated resources.

For MU-MIMO transmission, the total transmission power is shared among all paired UEs. In some embodiments, the total transmission power is equally shared among all paired UEs. As a result, each UE can only use the total power divided by the number of UEs, M.

Assume UE m (m from 1 to M) has two code words, each with $L_0$(m) and $L_1$(m) layers, respectively. Their SINRs are $SINR_0$(m) and $SINR_1$(m), in dB unit respectively. Because M users share the total transmission power, their SINRs are reduced accordingly to reflect that each UE can use total-Power/M. For each UE, the reduced SINRs for each code word is: $SINR_0$(m)=$SINR_0$(m)−10 log 10(M); and $SINR_1$(m)=$SINR_1$(m)−10 log 10(M). Each UE's inforBits is UeInforBits(m)=$L_0$(m)*Table($SINR_0$(m))+$L_1$(m)*Table($SINR_1$(m)). The total information bits is the sum of all UEs inforBits: sumInforBits=sum(UeInforBits(m), m=1 to M)).

The sumInforBits is proportional to the data rate that can be achieved by scheduling M paired UEs in the current TTI or slot. The method described above with respect SU-MIMO may be used to calculate its corresponding channel quality weight, $W_C$, by replacing UeInforBits with sumInforBits for each UE.

$$sumInforBits = sum(UeInforBits(m), m = 1 \text{ to } M)$$

$$W_C = lowerY + (sumInforBits - lowerX)\frac{upperY - lowerY}{upperX - lowerX}$$

$$W(m) = (1 - CQF)*W_R(m) + CQF*W_C$$

In assition to using the proposal fairness scheduling strategy to calculate the weights for both SU-MIMO and MU-MIMO, particular embodiments may use other scheduling strategy to calculate the UEs weight together with the channel quality weight, such as round robin and delay based scheduling strategies.

Figure 3:
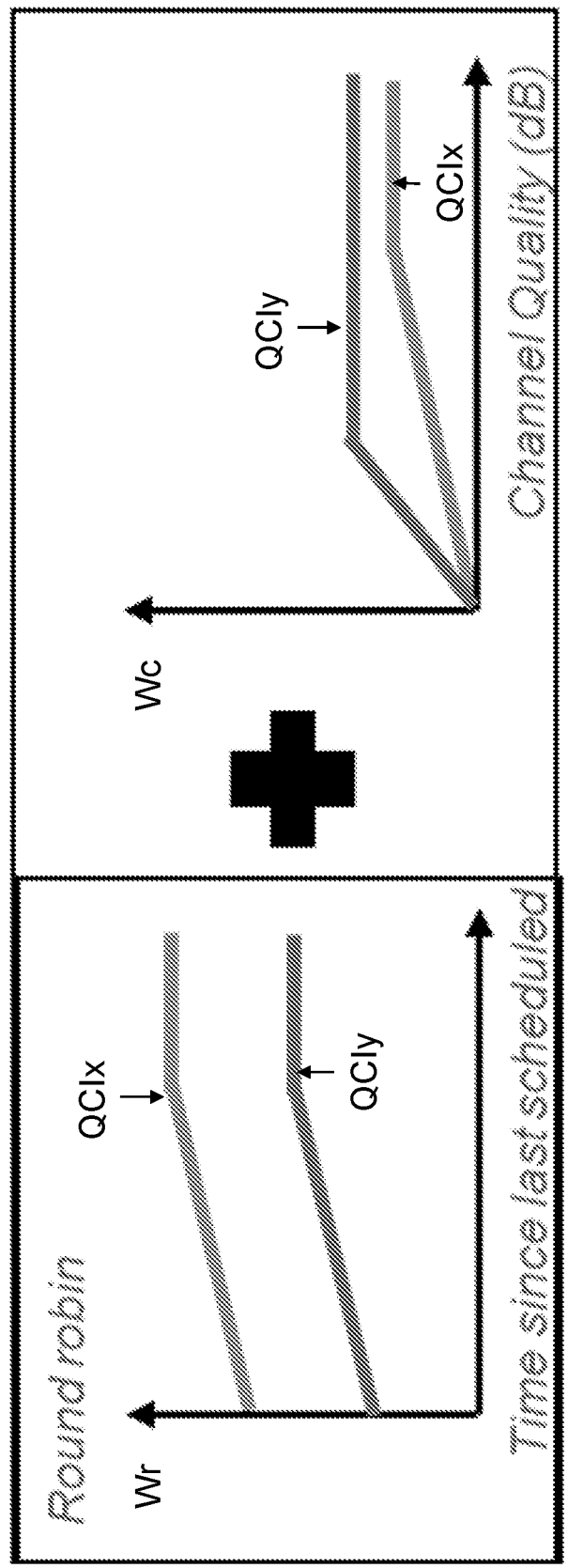
FIG. 3 graphs an example of weight functions with round robin plus channel quality scheduling strategy for two different QoS requirements.

FIG. 3 graphs an example of weight functions with round robin plus channel quality scheduling strategy for two different QoS requirements. The left hand graph illustrates a weight Wr as a function of the time since the UE was last scheduled for two QoS requirements, QCIx and QCIy. The vertical axis represents the weight and the horizontal axis represents the time since the UE was last scheduled. As illustrated, as the time since the UE was last scheduled increases, Wr increases. The right hand graph illustrates a weight Wc as a function of the channel quality for two QoS requirements, QCIx and QCIy. As the channel quality increases, Wc increases. The channel quality may be calculated according to any of the SU-MIMO and/or MU-MIMO embodiments described herein. Wr and Wc may be combined according to a PFS function or any other suitable function.

Figure 4:
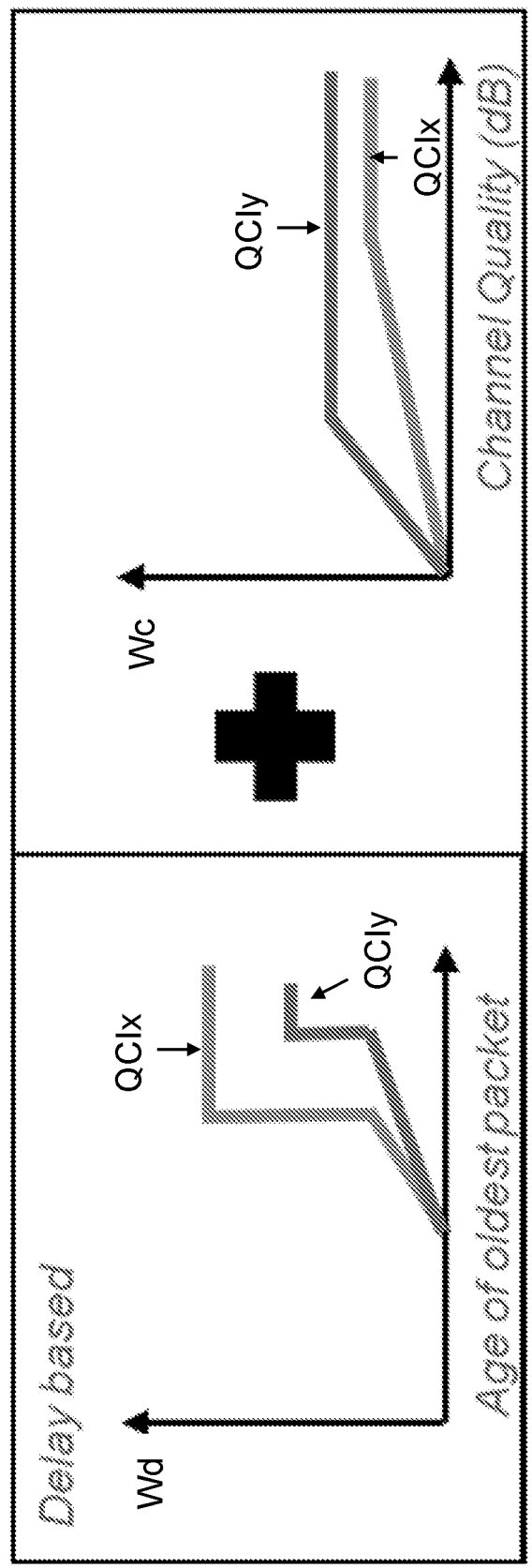
FIG. 4 graphs an example of weight functions with delay-based plus channel quality scheduling strategy for two different QoS requirements.

FIG. 4 graphs an example of weight functions with delay-based plus channel quality scheduling strategy for two different QoS requirements. The left hand graph illustrates a weight Wd as a function of the age of the oldest packet for two QoS requirements, QCIx and QCIy. The vertical axis represents the weight and the horizontal axis represents the age of the oldest packet. As illustrated, as the age of the last scheduled packet increases, Wd increases. The right hand graph illustrates a weight Wc as a function of the channel quality for two QoS requirements, QCIx and QCIy. As the channel quality increases, Wc increases. The channel quality may be calculated according to any of the SU-MIMO and/or MU-MIMO embodiments described herein. Wd and Wc may be combined according to a PFS function or any other suitable function.

Some embodiments may recalculate a UE weight during the scheduling phase. For example, a base station may schedule both downlink and uplink traffic. The base station first assigns physical downlink control channel (PDCCH) resources and then schedules downlink and uplink traffic independently. Both may compete for PDCCH resources.

First, the base station sorts the downlink scheduling request list and uplink scheduling request list independently based on their respective weights. Then the base station merges the downlink scheduling request list and uplink scheduling request together based on their weights into a combined sorted list. The higher the weight, the higher the rank in the sorted list.

The base station selects the scheduling candidate for assigning PDCCH one by one based on its order in the merged scheduling list. Because of limited PDCCH resources, some of scheduling requests with lower weights in the list may not be able to get PDCCH resources. As a result, they are removed from the merged scheduling request list for allocating physical downlink shared channel (PDSCH) or physical uplink shared channel (PUSCH) resources in the next step.

After completing the PDCCH resource allocation, the PDCCH allocator generates two scheduling request lists. One is for downlink and the other is for uplink. The two lists only contain the scheduling requests that already received PDCCH resources.

As described above, assume M users that can be paired for MU-MIMO transmission. Because of the limited PDCCH resources, some of them may be removed from the downlink or uplink scheduling list. As a result, their scheduling weights may be recalculated. For example, if the last K users are removed from the downlink list, the remaining (M-K) UE weights may be recalculated: $SINR_0(m)=SINR_0(m)-10 \log 10(M-K)$; and $SINR_1(m)=SINR_1(m)-10 \log 10(M-K)$. Each UEs inforBits is $UeInforBits(m)=L_0(m)*Table(SINR_0(m))+L_1(m)*Table(SINR_1(m))$, m=1, 2, . . . , (M-K).

$$sumInforBits = sum(UeInforBits(m), m = 1 \text{ to } M - K))$$

$$W_C = lowerY + (sumInforBits - lowerX)\frac{upperY - lowerY}{upperX - lowerX}$$

$$W(m) = (1 - CQF) * W_R(m) + CQF * W_C$$

Both downlink scheduling list and uplink scheduling list are sorted again based on the newly calculated weights. They will be passed to PDSCH and PUSCH resource allocators, respectively, to get PDSCH or PUSCH resources allocated.

Figure 5:
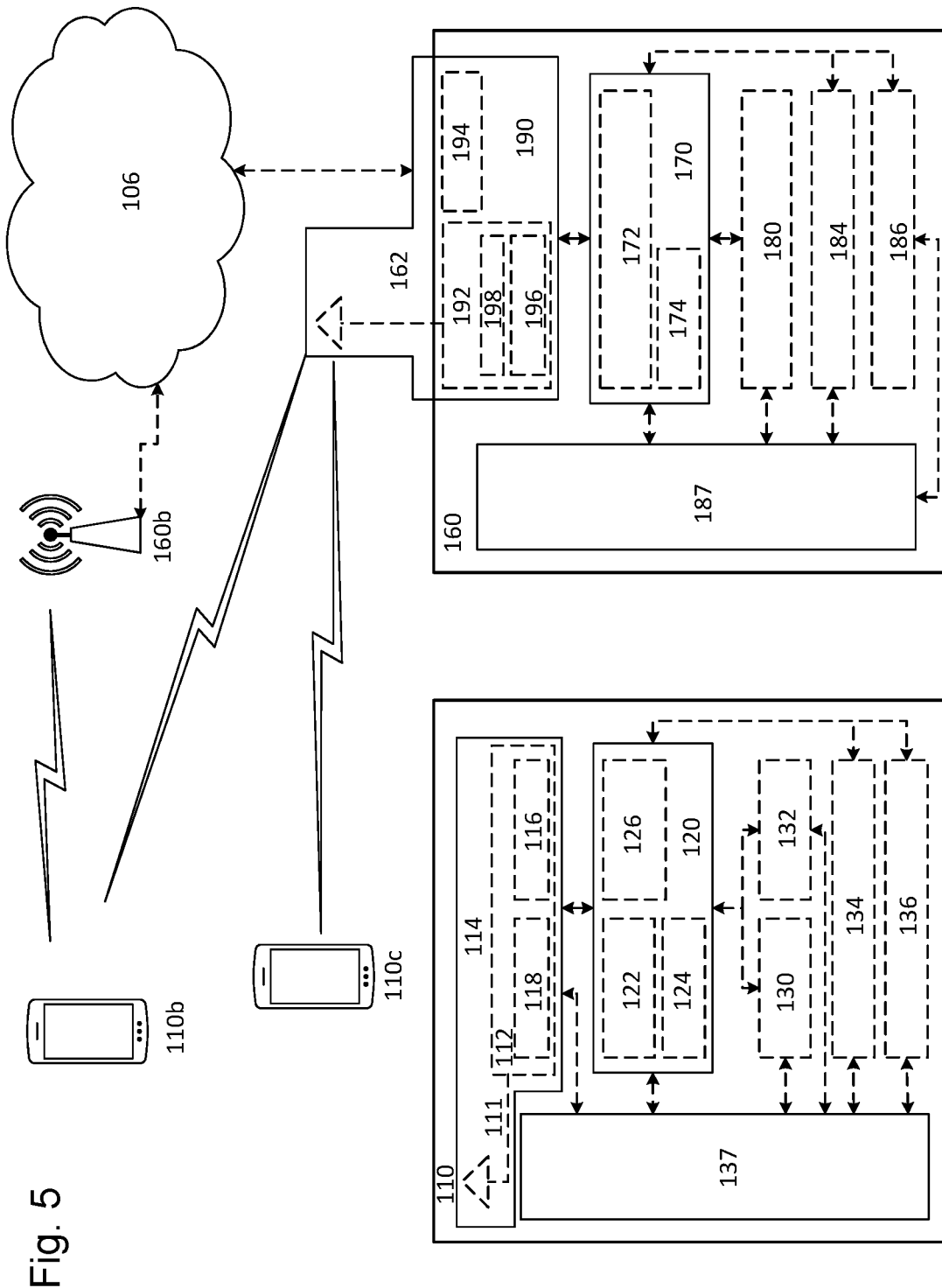
FIG. 5 is a block diagram illustrating an example wireless network.

FIG. 5 illustrates an example wireless network, according to certain embodiments. The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and may then also be referred to as femto base stations, pico base stations, micro base stations, or macro base stations.

A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 5, network node 160 includes processing circuitry 170, device readable medium 180, interface 190, auxiliary equipment 184, power source 186, power circuitry 187, and antenna 162. Although network node 160 illustrated in the example wireless network of FIG. 5 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and an RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node, such as the scheduling operations described herein and with respect of FIGS. 2-4. The operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units.

In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signaling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 5 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air.

In some embodiments, a WD may be configured to transmit and/or receive information without direct human interaction. For instance, a WD may be designed to transmit information to a network on a predetermined schedule, when triggered by an internal or external event, or in response to requests from the network.

Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device.

As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one example, the WD may be a UE implementing the 3GPP narrow band internet of things (NB-IoT) standard. Examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation.

A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g. RAM or ROM), mass storage media (e.g., a hard disk), removable storage media (e.g., a CD or a DVD), and/or any other volatile or non-volatile, non-transitory device readable and/or computer executable memory devices that store information, data, and/or instructions that may be used by processing circuitry 120. In some embodiments, processing circuitry 120 and device readable medium 130 may be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Although the subject matter described herein may be implemented in any appropriate type of system using any suitable components, the embodiments disclosed herein are described in relation to a wireless network, such as the example wireless network illustrated in FIG. 5. For simplicity, the wireless network of FIG. 5 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

The communication system 106 may itself be connected to a host computer (not shown), which may be embodied in the hardware and/or software of a standalone server, a cloud-implemented server, a distributed server or as processing resources in a server farm. The host computer may be under the ownership or control of a service provider or may be operated by the service provider or on behalf of the service provider.

The communication system of FIG. 5 as a whole enables connectivity between one of the connected WDs 110 and the host computer. The connectivity may be described as an over-the-top (OTT) connection. The host computer and the connected WDs 110 are configured to communicate data and/or signaling via the OTT connection, using an access network, a core network, any intermediate network and possible further infrastructure (not shown) as intermediaries. The OTT connection may be transparent in the sense that at least some of the participating communication devices through which the OTT connection passes are unaware of routing of uplink and downlink communications.

The host computer may provide host applications which may be operable to provide a service to a remote user, such as a WD 110 connecting via an OTT connection terminating at the WD 110 and the host computer. In providing the service to the remote user, the host application may provide user data which is transmitted using the OTT connection. The "user data" may be data and information described herein as implementing the described functionality. In one embodiment, the host computer may be configured for providing control and functionality to a service provider and may be operated by the service provider or on behalf of the service provider. The host computer may be enabled to observe, monitor, control, transmit to and/or receive from the network node 160 and or the wireless device 110.

One or more of the various embodiments in this disclosure improve the performance of OTT services provided to the WD 110 using the OTT connection. More precisely, the teachings of some of these embodiments may improve the data rate, latency, and/or power consumption and thereby provide benefits such as reduced user waiting time, relaxed restriction on file size, better responsiveness, extended battery lifetime, etc.

Figure 6A:
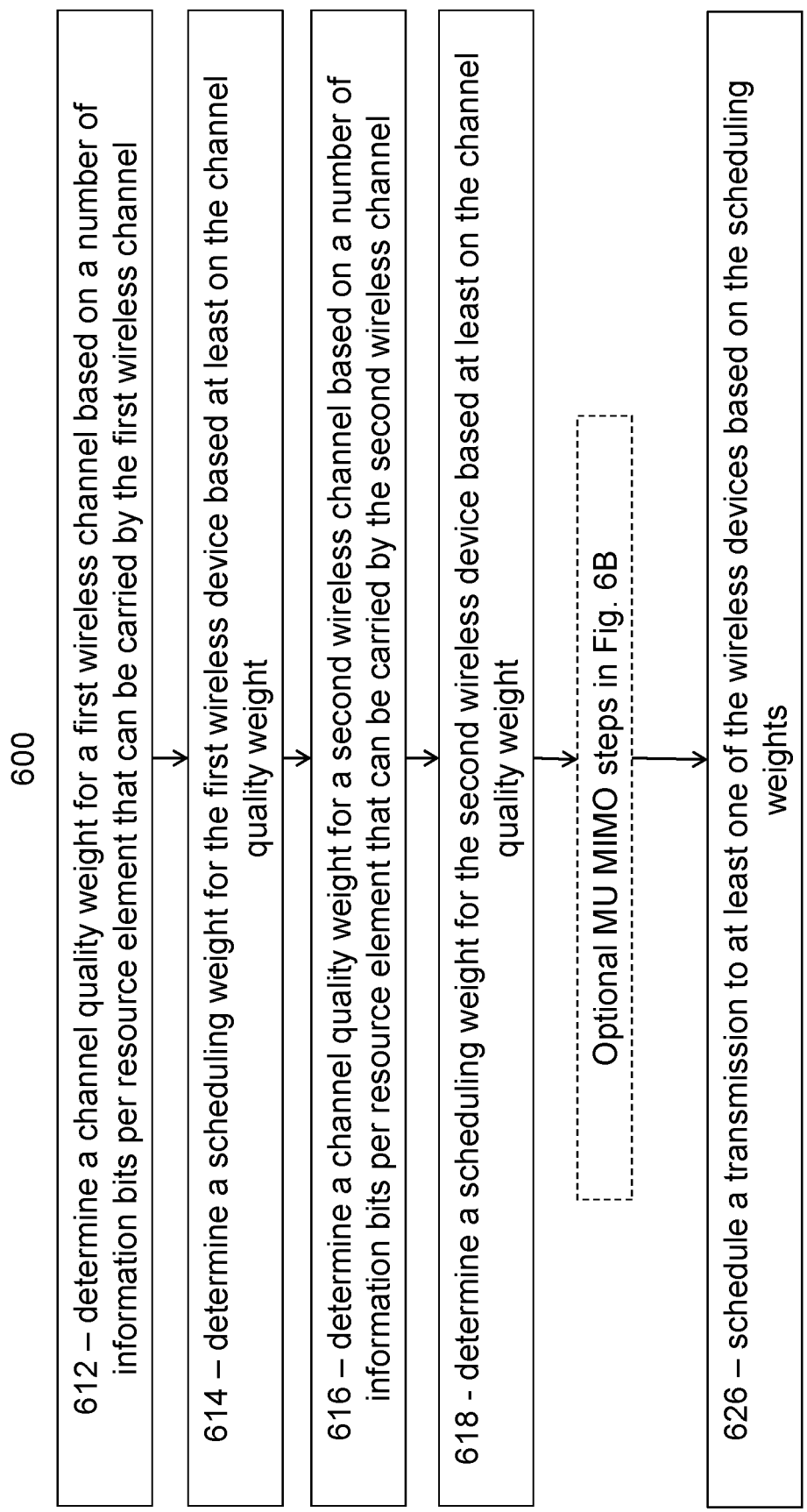
FIGS. 6A and 6B are a flowchart illustrating an example method in a network node, according to certain embodiments.
Figure 6B:
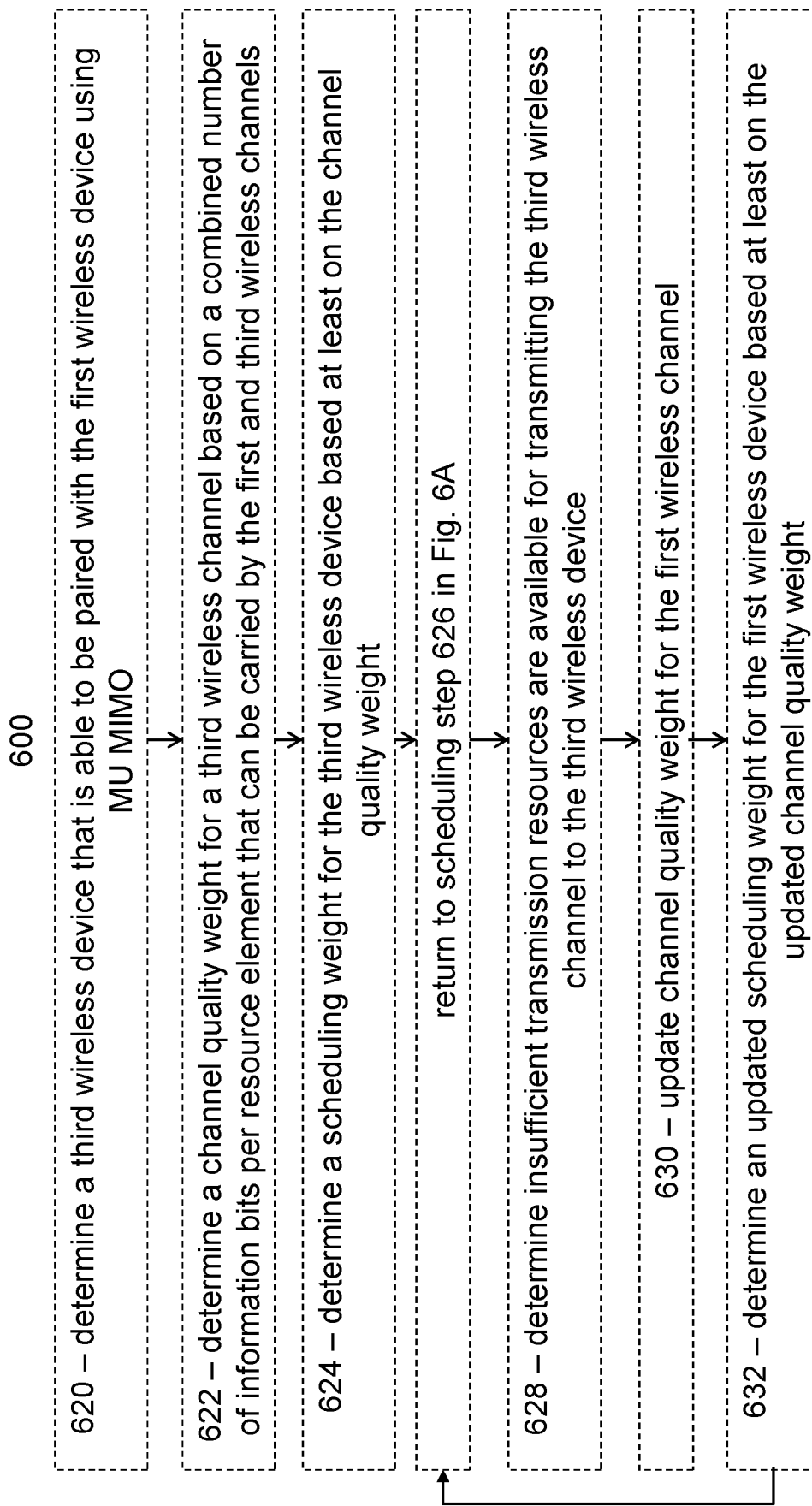

FIGS. 6A and 6B are a flowchart illustrating an example method 600 in a network node, according to certain embodiments. In particular embodiments, one or more steps of FIG. 6 may be performed by network node 160 described with respect to FIG. 5.

The method begins at step 612 where a network node (e.g., network node 160) determines a channel quality weight for a first wireless channel between the network node and a first wireless device based on a number of information bits per resource element that can be carried by the first wireless channel. The number of information bits per resource element that can be carried by the first wireless channel is based on a SINR measurement of the first wireless channel and a modulation coding scheme used for the first wireless channel (e.g., as described above with respect to FIG. 2). The channel quality weight derived from the information bits of all code words is proportional to the data rate that can be sent to a UE in the current transmission time interval (TTI) or slot. As a result, the cell throughput is higher than the conventional one under the same channel condition.

At step 614, the network node determines a scheduling weight for the first wireless device based at least on the channel quality weight for the first wireless channel.

At step 616, the network node determines a channel quality weight for a second wireless channel between the network node and a second wireless device based on a number of information bits per resource element that can be carried by the second wireless channel, similar to the determination at step 612 for the first wireless channel.

At step 618, the network node determines a scheduling weight for the second wireless device based at least on the channel quality weight for the second wireless channel. In some embodiments, determining the scheduling weight for any one of the wireless devices is based at least on the channel quality weight for the wireless channel to the wireless device and an average data rate for the wireless channel. In some embodiments, determining the scheduling weight for any one of the wireless devices is based at least on the channel quality weight for the wireless channel to the wireless device and one or more of a round robin algorithm (e.g., FIG. 3), a delay-based algorithm (e.g., FIG. 4), and/or any other suitable weight calculation algorithm.

The method may continue to step 626 where the network node schedules a transmission to at least one of the first and second wireless devices based on the scheduling weights of the first and second wireless devices. For example, the network node may give scheduling priority to the wireless device with the highest scheduling weight.

In some embodiments, the method includes MU-MIMO steps. For example, in step 620 the network node may determine a third wireless device is able to be paired with the first wireless device using MU-MIMO transmission.

At step 622, the network node determines a channel quality weight for a third wireless channel between the network node and the third wireless device based at least on a combined number of information bits per resource element that can be carried by the first wireless channel and the third wireless channel. The number of information bits per resource element that can be carried by the first wireless channel is based on a SINR measurement of the first wireless channel and a modulation coding scheme used for the first wireless channel and the number of bits per resource element that can be carried by the third wireless channel is based on a SINR measurement of the third wireless channel and a modulation coding scheme used for the third wireless channel.

By deriving the channel quality weight from the summation of the information bits of all wireless devices that can be paired together (e.g., the first and third wireless devices in this example), the pairable wireless devices for MU-MIMO will have more opportunities to be scheduled in the current TTI or slot, which improves cell throughput.

In some embodiments, the SINR measurement for the first wireless channel is calculated based on a first portion of a total amount of power available for transmission over at least the first and third wireless channels and the SINR measurement for the third wireless channel is calculated based on a second portion of the total amount of power available for transmission over at least the first and third wireless channels.

At step 624, the network node determines a scheduling weight for the third wireless device based at least on the channel quality weight for the third wireless channel.

In the MU-MIMO example, when determining the channel quality weight for the first wireless channel between the network node and the first wireless device previously at step 612, the network node would have also determined the channel quality weight based at least on the combined number of information bits per resource element that can be carried by the first wireless channel and the third wireless channel. The method may then continue to step 626 where the network node schedules the wireless devices for transmission.

In some embodiments, during the scheduling process the network node may determine at step 628 that insufficient transmission resources are available for transmitting to one or more of the first, second, and/or third wireless devices. If so, the network node may remove one or more wireless devices from its list of wireless devices to schedule.

At step 630, the network node updates the channel quality weights for the first, second, and/or third wireless devices, using the number of information bits per resource element that can be carried by each device, but this time based on the reduced list of wireless devices to schedule.

At step 632, the network node determines a updated scheduling weights for the wireless devices based at least on the updated channel quality weights for the wireless devices.

The method returns to step 626 where the network node schedules the wireless devices based on the updated scheduling weights.

Modifications, additions, or omissions may be made to method 600 of FIG. 6. Additionally, one or more steps in the method of FIG. 6 may be performed in parallel or in any suitable order.

Figure 7:
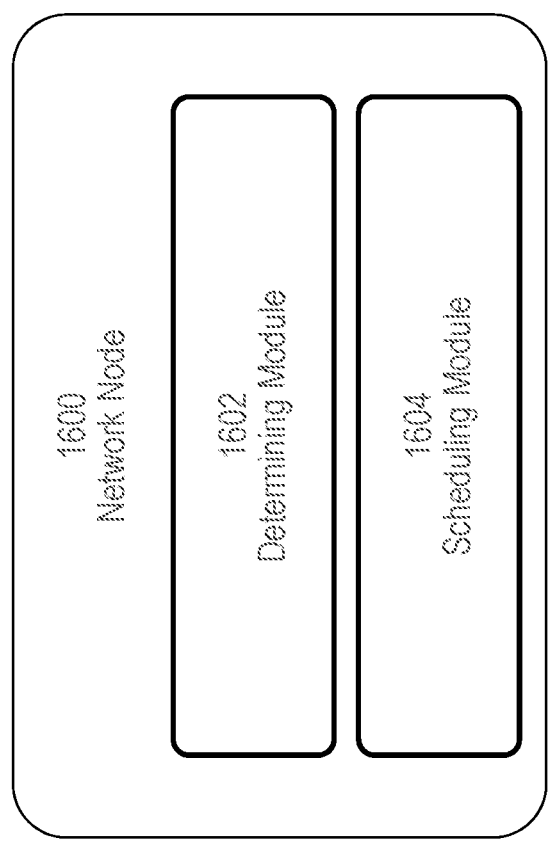
FIG. 7 illustrates an example network node, according to certain embodiments.

FIG. 7 illustrates an example network node, according to certain embodiments. The network node 1600 may comprise network node 160 illustrated in FIG. 5.

Network node 1600 is operable to carry out the example method described with reference to FIG. 6 and possibly any other processes or methods disclosed herein. It is also to be understood that the method of FIG. 6 is not necessarily carried out solely by apparatus 1600. At least some operations of the method can be performed by one or more other entities, including virtual apparatuses.

Network node 1600 may comprise processing circuitry such as 170 of FIG. 5. In some implementations, the processing circuitry may be used to cause determining module 1602, scheduling module 1604, and any other suitable units of network node 1600 to perform corresponding functions according one or more embodiments of the present disclosure.

As illustrated in FIG. 7, network node 1600 includes determining module 1602 and scheduling module 1604. In certain embodiments, determining module 1602 may determine scheduling weights for wireless devices according to any of the embodiments and examples described above. Scheduling module 1604 may schedule transmissions to or from wireless devices according to any of the embodiments and examples described herein.

Figure 8:
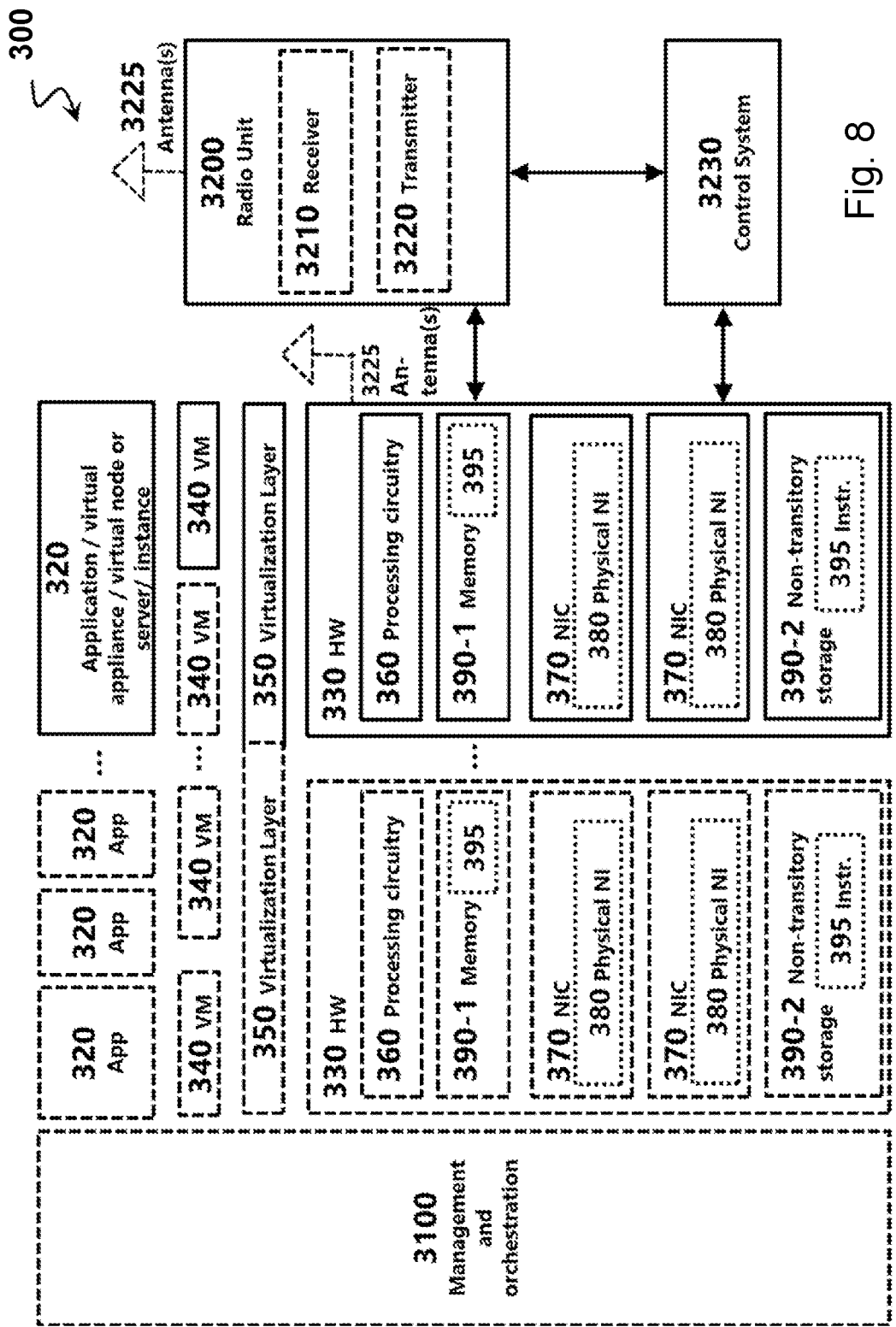
FIG. 8 illustrates an example virtualization environment, according to certain embodiments.

FIG. 8 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein, such as the method of FIG. 6, may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 8, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 8.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be effected with the use of control system 3230 which may alternatively be used for communication between the hardware nodes 330 and radio units 3200.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa.

The foregoing description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the claims below.

The invention claimed is:

1. A method for use in a network node for scheduling wireless transmissions, the method comprising:
   determining a first channel quality weight for a first wireless channel between the network node and a first wireless device based on a first number of information bits per resource element that is configured to be carried by the first wireless channel, wherein the first number of information bits per resource element that is configured to be carried by the first wireless channel is based on a signal to interference plus noise (SINR) measurement of the first wireless channel and a modulation coding scheme used for the first wireless channel;
   determining a first scheduling weight for the first wireless device based at least on the first channel quality weight for the first wireless channel;
   determining a second channel quality weight for a second wireless channel between the network node and a second wireless device based on a second number of information bits per resource element that is configured to be carried by the second wireless channel, wherein the second number of information bits per resource element that is configured to be carried by the second wireless channel is based on a SINR measurement of the second wireless channel and a modulation coding scheme used for the second wireless channel;
   determining a second scheduling weight for the second wireless device based at least on the second channel quality weight for the second wireless channel;
   determining a condition that insufficient network resources exist to transmit the first number of information bits per resource element using the first wireless channel;
   in response to determining the condition that insufficient network resources exist to transmit the first number of information bits per resource element using the first wireless channel, determining an updated second channel quality weight based at least on the second number of information bits per resource element;
   determining an updated second scheduling weight based at least on the updated second channel quality weight; and
   scheduling a transmission to at least one of the first and second wireless devices based on the first scheduling weight of the first wireless device and the updated second scheduling weight of the second wireless device.

2. The method of claim 1, further comprising:
   determining a third wireless device is able to be paired with the first wireless device using multi-user (MU) multiple input multiple output (MIMO) transmission;
   determining a third channel quality weight for a third wireless channel between the network node and the third wireless device based at least on a combined number of information bits per resource element that is configured to be carried by the first wireless channel and the third wireless channel, wherein the number of information bits per resource element that is configured to be carried by the first wireless channel is based on a SINR measurement of the first wireless channel and a modulation coding scheme used for the first wireless channel and the number of bits per resource element that is configured to be carried by the third wireless channel is based on a SINR measurement of the third wireless channel and a modulation coding scheme used for the third wireless channel;
   determining a third scheduling weight for the third wireless device based at least on the third channel quality weight for the third wireless channel; and
   wherein determining the first channel quality weight for the first wireless channel between the network node and the first wireless device comprises determining the third channel quality weight based at least on the combined number of information bits per resource element that is configured to be carried by the first wireless channel and the third wireless channel.

3. The method of claim 2, wherein the SINR measurement for the first wireless channel is calculated based on a first portion of a total amount of power available for transmission over at least the first and third wireless channels and the SINR measurement for the third wireless channel is calculated based on a second portion of the total amount of power available for transmission over at least the first and third wireless channels.

4. The method of claim 2, wherein scheduling the transmission comprises determining insufficient transmission resources are available for transmitting the third wireless channel to the third wireless device;
   the method further comprising:
      determining an updated third channel quality weight for the first wireless channel between the network node and the first wireless device based on a third number of information bits per resource element that is configured to be carried by the first wireless channel, wherein the third number of information bits per resource element that is configured to be carried by the first wireless channel is based on the SINR measurement of the first wireless channel and a modulation coding scheme used for the first wireless channel;
      determining an updated third scheduling weight for the first wireless device based at least on the updated third channel quality weight for the first wireless channel; and
      scheduling a transmission to at least one of the first and second wireless devices based on the updated third scheduling weight of the first wireless device and the updated second scheduling weight of the second wireless device.

5. The method of claim 1, wherein determining the scheduling weight for any one of the wireless devices is based at least on the channel quality weight for the wireless channel to the wireless device and an average data rate for the wireless channel.

6. The method of claim 1, wherein determining the scheduling weight for any one of the wireless devices is based at least on the channel quality weight for the wireless channel to the wireless device and a round robin algorithm.

7. The method of claim 1, wherein determining the scheduling weight for any one of the wireless devices is based at least on the channel quality weight for the wireless channel to the wireless device and a delay-based algorithm.

8. A network node operable to schedule wireless transmissions, the network node comprising processing circuitry operable to:
   determine a first channel quality weight for a first wireless channel between the network node and a first wireless device based on a first number of information bits per resource element that is configured to be carried by the first wireless channel, wherein the first number of information bits per resource element that is configured to be carried by the first wireless channel is based on a signal to interference plus noise (SINR) measurement of the first wireless channel and a modulation coding scheme used for the first wireless channel;

determine a first scheduling weight for the first wireless device based at least on the first channel quality weight for the first wireless channel;

determine a second channel quality weight for a second wireless channel between the network node and a second wireless device based on a second number of information bits per resource element that is configured to be carried by the second wireless channel, wherein the second number of information bits per resource element that is configured to be carried by the second wireless channel is based on a SINR measurement of the second wireless channel and a modulation coding scheme used for the second wireless channel;

determine a second scheduling weight for the second wireless device based at least on the second channel quality weight for the second wireless channel;

determine a condition that insufficient network resources exist to transmit the first number of information bits per resource element using the first wireless channel;

in response to determining the condition that insufficient network resources exist to transmit the first number of information bits per resource element using the first wireless channel, determine an updated second channel quality weight based at least on the second number of information bits per resource element;

determine an updated second scheduling weight based at least on the updated second channel quality weight; and schedule a transmission to at least one of the first and second wireless devices based on the first scheduling weight of the first wireless device and the updated second scheduling weight of the second wireless device.

9. The network node of claim 8, the processing circuitry further operable to:

determine a third wireless device is able to be paired with the first wireless device using multi-user (MU) multiple input multiple output (MIMO) transmission;

determine a third channel quality weight for a third wireless channel between the network node and the third wireless device based at least on a combined number of information bits per resource element that is configured to be carried by the first wireless channel and the third wireless channel, wherein the number of information bits per resource element that is configured to be carried by the first wireless channel is based on a SINR measurement of the first wireless channel and a modulation coding scheme used for the first wireless channel and the number of bits per resource element that is configured to be carried by the third wireless channel is based on a SINR measurement of the third wireless channel and a modulation coding scheme used for the third wireless channel;

determine a third scheduling weight for the third wireless device based at least on the channel quality weight for the third wireless channel; and wherein the processing circuitry is operable to determine the first channel quality weight for the first wireless channel between the network node and the first wireless device by determining the third channel quality weight based at least on the combined number of information bits per resource element that is configured to be carried by the first wireless channel and the third wireless channel.

10. The network node of claim 9, wherein the SINR measurement for the first wireless channel is calculated based on a first portion of a total amount of power available for transmission over at least the first and third wireless channels and the SINR measurement for the third wireless channel is calculated based on a second portion of the total amount of power available for transmission over at least the first and third wireless channels.

11. The network node of claim 9, wherein the processing circuitry is operable to schedule the transmission by determining insufficient transmission resources are available for transmitting the third wireless channel to the third wireless device;

the processing circuitry further operable to:

determine an updated third channel quality weight for the first wireless channel between the network node and the first wireless device based on a third number of information bits per resource element that is configured to be carried by the first wireless channel, wherein the third number of information bits per resource element that is configured to be carried by the first wireless channel is based on the SINR measurement of the first wireless channel and a modulation coding scheme used for the first wireless channel;

determine an updated third scheduling weight for the first wireless device based at least on the updated third channel quality weight for the first wireless channel; and schedule a transmission to at least one of the first and second wireless devices based on the updated third scheduling weight of the first wireless device and the updated second scheduling weight of the second wireless device.

12. The network node of claim 8, wherein the processing circuitry is operable to determine the scheduling weight for any one of the wireless devices based at least on the channel quality weight for the wireless channel to the wireless device and an average data rate for the wireless channel.

13. The network node of claim 8, wherein the processing circuitry is operable to determine the scheduling weight for any one of the wireless devices based at least on the channel quality weight for the wireless channel to the wireless device and a round robin algorithm.

14. The network node of claim 8, wherein the processing circuitry is operable to determine the scheduling weight for any one of the wireless devices based at least on the channel quality weight for the wireless channel to the wireless device and a delay-based algorithm.

* * * * *